United States Patent [19]
Fausel et al.

[11] 3,758,949
[45] Sept. 18, 1973

[54] DIGITIZER

[75] Inventors: Charles A. Fausel, Chicago, Ill.;
Allan A. Lorenz, Willowick, Ohio

[73] Assignee: Teletype Corporation, Skokie, Ill.

[22] Filed: Jan. 6, 1971

[21] Appl. No.: 104,381

[52] U.S. Cl.................. 33/1 M, 250/231, 250/233
[51] Int. Cl. .......................................... G09b 29/10
[58] Field of Search.................. 33/1 M; 235/61.6 A

[56] References Cited
UNITED STATES PATENTS

| | | | |
|---|---|---|---|
| 3,396,402 | 8/1968 | de Mey | 33/1 M |
| 3,449,833 | 6/1969 | Dzula | 33/1 M |
| 3,505,670 | 4/1970 | Cone et al. | 33/1 M |
| 3,518,661 | 6/1970 | Wingate | 33/1 M |

*Primary Examiner*—Robert B. Hull
*Attorney*—J. L. Landis and R. P. Miller

[57] ABSTRACT

Digital readout data of coordinates of points in a two dimensional system is generated in a pair of counters in response to the angular positions of the following: (1) a first disc rotatable in response to movement of a first slider in a straight path to a selected position, and (2) a second disc rotatable in response to movement of the first slider and in response to movement of a second slider in a straight path to a selected position. The second slider is carried from the first slider and arranged for movement therewith and normally thereto independently thereof. Effect on readout due to movement of the second slider resulting from the movement of the first slider is prevented because the discs are mounted for rotation simultaneously upon movement of the first slider. A sensing assembly adapted for detecting the relative angular displacement of the second disc and actuating an associated counter is carried with said first disc for rotation relative to the second disc.

12 Claims, 8 Drawing Figures

3,758,949

PATENTED SEP 18 1973

INVENTORS
CHARLES A. FAUSEL
ALLAN A. LORENZ

BY  *J. L. Landis*

ATTORNEY

PATENTED SEP 18 1973 3,758,949

DIGITIZER

BACKGROUND OF THE INVENTION

This invention relates to a digitizer apparatus adapted for obtaining a digital readout of orthogonal coordinates of points in a two dimensional or planar system. It is adaptable as a drafting instrument in which function it has been conventionally and variously referred to as an apparatus for layout, plotting or drafting.

A known digitizer has a pair of rotatable members, each of which is associated with one of a pair of orthogonal coordinates and is arranged for rotation about its axis in response to a slider movement in a straight path longitudinally of one of said coordinates. The agency or transducer for translation of the linear movement of each slider to angular movement of an associated rotatable member comprises a pulley. Readout of the coordinates of the points is generated according to the angular conditions of the rotatable members.

However, the sizes of the rotatable members are restricted because they are required to be mounted at or near the plotting plane of the digitizer, with one thereof on a slider. This limitation relates to digitizer accuracy which is a function of the size of the rotatable members, accuracy increasing in proportion to increase in size. Other approaches to high accuracy lead to very high cost.

It is an object of the present invention to provide a new and improved digitizer.

It is another object of the invention to remove restraints on digitizer accuracy as a function of cost by reason of transducer location.

It is a further object of the invention to maximize digitizer accuracy without corresponding increase in work area requirement.

SUMMARY OF THE INVENTION

To achieve the foregoing, and other objects of the invention which will become apparent from the ensuing description, transducing means in a digitizer comprises a first member mounted for rotation in response to movement of a first element along a first straight course and a second member which is mounted for rotation in response to a second element carried with said first element for movement along a second course defined by said first element normally to said first course. A display shows a symbol representative of the angular condition of each member. Means are provided for rotating said second member simultaneously with said first member in response to movement along said first course to prevent an effect on the display due to movement of said second element resulting from movement of said first element.

Considered from another aspect, the aforesaid objects are effected through the agency of a digitizer which has an axis of rotation. A first member is mounted for rotation about said axis in response to linear movement in a first straight path. A second member is mounted coaxially and parallel to said first member for rotation about said axis in response to linear movement in said first straight path and in a second straight path normal to said first straight path. Means are provided for generating a first output in response to the angular distance through which said first member rotates. Means are provided for generating a second output in response to the angular distance through which the second member rotates by reason of movement in said second straight path. Means are provided for preventing output in response to the angular distance through which the second member rotates by reason of movement in said first straight path.

BRIEF DESCRIPTION OF THE DRAWINGS

In the ensuing detailed description of the invention, reference is had to the accompanying drawing, in which:

FIG. 4 is a detailed view in vertical section according to line 4—4 in FIG. 3;

FIG. 5 is an enlarged view of transducer means comprising said digitizer according to the line 5—5 of FIG. 2;

FIG. 6 is a vertical sectional view of the transducer means according to line 6—6 of FIG. 5;

FIG. 7 is a view of a second slider comprising said digitizer according to line 7—7 of FIG. 1; and FIG. 8 is a vertical sectional view according to the line 8—8 of FIG. 5 and illustrating a switch for up and down counting.

DETAILED DESCRIPTION OF THE INVENTION

Figure 1:
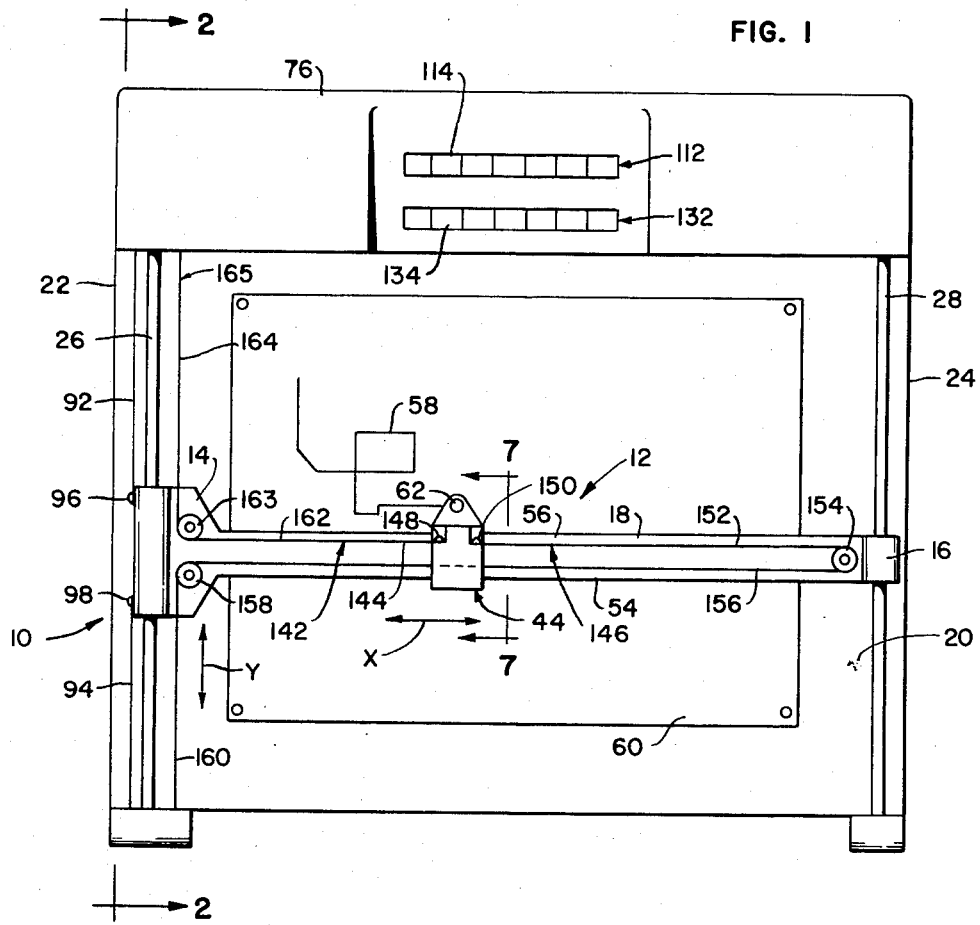
FIG. 1 is a top plan view of a digitizer embodying the present invention.

Referring now more particularly to FIG. 1, shown is a digitizer generally designated 10. It comprises a first element or slider 12 having opposed end portions 14 and 16 and a body or medial section 18 which extends transversely of a rectangular table or drafting board 20, adjacent parallel sides 22 and 24 of which end portions 14 and 16 are disposed.

Figure 2:
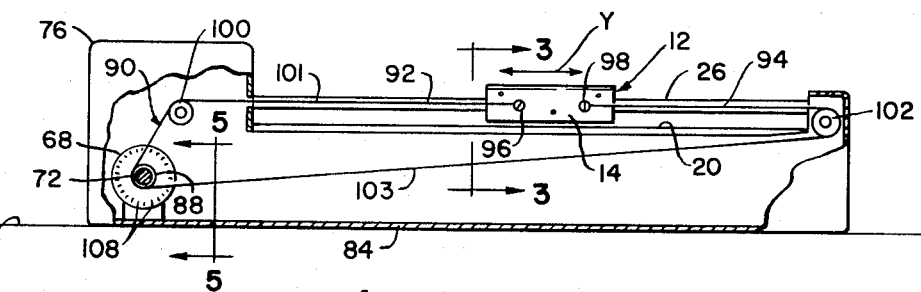
FIG. 2 is a side elevational view of said digitizer according to line 2—2 of FIG. 1 and showing a first slider, parts being broken away for the purpose of illustration.
Figure 3:
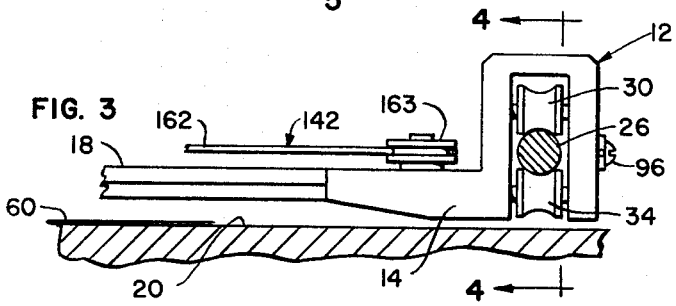
FIG. 3 is a detailed view in vertical section according to line 3—3 of FIG. 2.

A pair of parallel rails 26 and 28 extending parallel to and adjacent sides 22 and 24 of table 20 support slide 12 adjacent through superposed from and parallel to the table for movement in a first straight path or course longitudinally of and defined by said rails (in the Y direction according to the arrows in FIGS. 1 and 2). For that purpose, end portion 16 is a cylinder, being journalled about the rail 28; and end portion 14 is fashioned as a trolley, having a pair of grooved wheels 30 and 32 (FIG. 4) which frictionally engage against the upper surface of rail 26, and having a lower grooved wheel 34 which frictionally engages against the lower surface of said rail. Wheels 30 and 32 are rotational about a pair of pins 36 and 38 which are spaced apart longitudinally of said rail; and wheel 34 is rotational about a pin 40 disposed medially of the pins 36 and 38 whereby movement of the slide longitudinally of said first straight course will be smooth.

A second element or slider 44 (FIGS. 1 and 7) is carried from slider 12 for movement therewith in the Y direction as said first slider moves longitudinally of the first path The second slider is also adapted to move longitudinally of body 18, independently of slider 12, in a second straight path or course defined by said body and disposed perpendicular to the first course (arrow X in FIG. 1). In the illustrated embodiment, the second slider has a pair of depending pins 46 and 48 (FIG. 7) which are spaced apart in a direction of elongation of rails 26 and 28. A pair of grooved rollers 50 and 52 are rotationally mounted on said pins, their grooves being proportioned for rotationally engaging opposed parallel sides 54 and 56 of body 18 whereby said second slider is supported superposed and parallel to table 20 for movement longitudinally of said body.

For tracing a pattern 58 (FIG. 1) on, for example, a sheet 60 secured in a plane, adjacent and parallel to table 20, a scribe or suitable pointed locating element 62 is rigidly secured by any suitable means to and depends from slider 44. To provide a readout of the coordinates of points in a trace made by the scribe, in accordance with the present invention, transducer means herein comprises a first transducer generally designated 64 (FIG. 5) responsive to movement in the Y direction and a second transducer generally designated 66 and responsive to movement in the X direction. The transducers are characterized by corresponding rotatable assemblies herein shown including discs 68 and 70 which are arranged for rotation about a common axis 71 defined by a first rotatable support element or shaft 72. However, disc 70 is rotatable independently of disc 68, being secured to a second rotatable support element, cylinder or hollow shaft 74 which is circumposed for rotation about shaft 72.

In the exemplary embodiment, transducers 64 and 66 are mounted within a housing 76 (FIG. 1 and 2) which is supported adjacent table 20 on an extension 78 thereof. Within the housing the opposed end portions of shaft 72 rotationally are supported in a pair of spaced apart journalling blocks 80 and 82 which project vertically, upwardly from a base or floor 84 (FIGS. 2 and 5) of the housing.

A hub 85 of disc 68 is rigidly secured to shaft 72 by a suitable fastener such as a set screw 86, whereby disc 68 is constrained for rotation with said last shaft. A sheave 88 comprising pulley means, herein shown fastened integrally with said hub, translates the linear movement of slider 12 in the y direction into angular movement of disc 68 about axis 71. This is achieved through the agency of a belt or cord 90 (FIGS. 2 and 5) included in said pulley means and which is disposed in a plane and has a lower course with a medial portion 91 frictionally coiled about sheave 88. Opposed end portions 92 and 94 of said cord (FIGS. 1 and 2) are secured to opposite end portions of slider end portion 14 and in alignment parallel to rails 26 and 28 by suitable fasteners 96 and 98. Said cord is also entrained about a pair of guide wheels 100 and 102. They are mounted in spaced apart relationship longitudinally of the first path parallel to side 22 of the table 20 such that upper and lower belt courses 101 and 103 are disposed in a plane parallel to rails 26 and 28 and parallel to sheave 88. Accordingly, as the slider 12 moves to the right (as seen in FIG. 2), disc 68 will rotate clockwise. The arrangement is such that, for each linear position of said last slider, there is a corresponding angular position of disc 68 about said axis.

Means for generating a first output in response to the angle through which disc 68 rotates comprises a counting or sensing assembly 105 (FIG. 5) which includes a first photosensor 104 and a lamp 106. They are secured to housing base 84, being disposed on opposite sides of said disc and proportioned such that they are operably aligned through any of a plurality of apertures 108 in the peripheral end portion of said disc. In consequence of the foregoing arrangement, as disc 68 is rotated in any selected direction, the light from the associated lamp will impinge on the photosensor through apertures 108 as a succession of light impulses, interrupted by the fabric of the disc, and will cause the photosensor, as means for counting disc apertures, to generate a succession of responsive outputs through one of its leads 110. These outputs actuate registering means, herein shown as an "up-down" counter 112 (FIG. 1), which may be a binary or a ring counter of conventional construction, whereby predetermined increments of movement of slide 12 in the Y direction will have distinctive numerical representations or symbols visible at a display 114 of said counter.

Counting up or down according to the direction of rotation depends on the state of an up-down switch 115 (FIGS. 5 and 8). Herein said switch is carried from one end portion of an arm 116, the opposite end portion of which is secured to block 82 by a fastener 118. The switch has an "up" counting state when shaft 72 rotates clockwise (with respect to FIG. 8) and a "down" counting state when the shaft rotates counterclockwise. The direction of rotation is detected by a switch sensor 120 which rides along the surface of a collar 121, said collar being secured to the shaft 72. The arrangement is such that, as the shaft rotates clockwise the sensor is urged upwardly and when the shaft rotates counterclockwise the sensor is urged downwardly. One state of the switch corresponds to each position of the sensor; and a corresponding "count up" or "count down" signal from said switch through a lead 122 to counter 112 produces a corresponding up or down counter counting mode.

Another up-down switch 126 is supported from arm 116, for detecting the direction of movement of the second slider 44 in the X direction. The switch 126 is responsive to the direction of rotation of disc 70. Its sensor arm 128 rides against a collar 130 and is movable upwardly and downwardly according to the direction of rotation of the outer, hollow shaft 74 on which said last collar is rigidly secured. Like switch 114, switch 126 is adapted to provide a selected one of a pair of signals depending upon the position of its sensor. By conventional means (not shown), said last switch is adapted to impose its outputs on registering means comprised of a second "up-down" counter 132 (FIG. 1), similar to the counter 112, to set its mode such that its display 134 will count up or down depending upon the direction of rotation of disc 70, corresponding to increments of movement of the second slider 44 in the X direction.

In the exemplary embodiment, the hollow shaft 74 is part of an integral assembly retained from shifting longitudinally of said shaft by a pair of retainers 136 and 138 (FIG. 5). Disc 70 is included at one end of said assembly, said disc being disposed parallel to disc 68. A sheave 139 comprising pulley means is fashioned at one end of the hub 140 of disc 70. Frictional engagement of a belt or cord 142 included in said pulley means and entrained about said sheave results in rotation of disc 70. By reason of the connection of said cord and slider 44, a description of which will be amplified on hereinafter, disc 70 has an angular condition and counter 132 displays a distinctive numerical representation corresponding to each predetermined increment of position of slider 44 along the body 18 of the first slider 12.

To effect the translation of the linear motion of the slider 44 into rotation of disc 70, the opposite end portions 144 and 146 (FIG. 1) of the cord 142 are rigidly secured by suitable fasteners 148 and 150 to the slider 44 in spaced apart positions aligned longitudinally of body 18. From fastener 150, a stretch 152 of the cord extends toward rail 28 in alignment with both fasteners and along body 18. A guide roller 154 carried on said body adjacent end portion 16 and about which said cord is entrained separates stretch 152 from a parallel stretch 156 of the cord which extends through or under the slider 44 (FIG. 7) along body 18 to end portion 14 of slider 12. Thereat cord 142 changes course about a guide roller 158 carried on said last end portion and into a stretch 160 extending outwardly from said end portion parallel to rail 26. From fastener 148 a stretch 162 of the cord extends along body 18 parallel to stretch 156 and in alignment with stretch 152 toward rail 26. A guide roller 163 carried from said last end portion and spaced from roller 158 longitudinally of rail 26, changes the course of the cord from stretch 162 into a stretch 164. The latter is aligned with and extends from slider 12 outwardly in a direction opposite to stretch 160. Stretch 160 and 166 define the upper course of a loop 165 which is disposed in a plane parallel to the rails 26 and 28 and has a lower course with a medial portion 161 (FIG. 5) frictionally coiled about sheave 139 for rotating disc 70 responsively to movement of slider 44.

Means for generating a second output, this in response to the angular distance through which disc 70 rotates by reason of movement in the second path, comprises a counting or sensing assembly 167, which includes a second photosensor 169 (FIG. 5) and a lamp 168. They are disposed on opposite sides of disc 70 and are aligned through any of the regularly and arcuately spaced apart apertures 170 in the peripheral end portion of said disc (FIG. 6). In consequence of the foregoing arrangement, as disc 70 is rotated in any selected direction relative to assembly 167, the light will impinge on said photosensor through apertures 170 as a succession of light impulses, interrupted by the fabric of said disc, and will cause the photosensor, as means for counting disc apertures, to generate a succession of responsive outputs to counter 132 for counting increments of movement of the second slider 44 in the X direction.

Consider now operation of the digitizer. Assume slider 12 is moved longitudinally along the first course, for example, upwardly with respect to FIG. 1, from any one position to any other position. In consequence thereof, sheave 139 will rotate to rotate the transducer disc 70. However, slider 44 will retain its same relative position with respect to body 18. While the movement of slider 12 lengthens stretch 160 of belt 142, the increase in length is at the expense of stretch 164 which becomes shortened correspondingly, the relative position of the sliders 12 and 44 remaining unaffected.

Means for preventing output in response to the angular distance through which disc 70 rotates by reason of movement of slider 12 in its first path along rails 26 and 28 comprises a securance of the sensing assembly 167 to shaft 72. To achieve the securance, a vertically extending arm 172 (FIGS. 5 and 6) parallel to disc 70 supports sensor 169 and an offset extension 174 of said arm supports lamp 168. An electrically insulative sleeve 176, about which the lower end portion of said arm is rigidly secured, is itself coaxially secured to the outer surface of shaft 72 for rotation therewith.

The diameters of disc 68 and 70 are equal. The disposition and size of apertures 108 and 170 in either of the discs is the same as in the other thereof. In consequence, when slider 12 moves either to or fro, though disc 70 rotates, there will be no relative displacement between assembly 167 and said last disc and therefore no change in the X-counter 132. That counter will only count when slider 44 moves independently of slider 12.

Lamp 168 is in an electrical circuit with input and output leads 180 and 182 which have portions extending axially through sleeve 176. Photosensor 169 is in an electrical circuit with input and output leads 184 and 186 which have portions extending axially through sleeve 176. A plurality of conductive axially spaced terminal rings 188, 190, 192, and 194 are circumposed about sleeve 176 to which they are secured rigidly and with which they are rotatable. Each ring is electrically connected to one of the leads 180, 182, 184, and 186 in the manner shown for the connection between lead 186 and ring 194 (FIG. 6). A fixed bracket 196 projects upwardly from floor 84 and supports a terminal holder 198. A bank of flexible terminals or sensors 200, 202, 204 and 206 are fashioned as leaf springs and project from holder 198 such that each thereof maintains continuous electrical contact with one of the rings 188, 190, 192, and 194, regardless of the angular condition of shaft 72. Each of said sensors is electrically connected in holder 198 to a wire 207 only one of which is shown in FIG. 6. Through wires 207 associated with rings 188 and 190, lamp 168 is connected to opposed sides of a power source (not shown). Through wires 207 associated with rings 192 and 194 photosensor 169 is connected to the input side of counter 132.

It is observed that transducers 64 and 66 are spaced from the table 20. Moreover, they are spaced from sliders 12 and 44; and while they are shown at or near table level, such arrangement is not critical to the invention and other suitable positions may be selected. For example, the transducers may be suitably suspended from beneath table 20. Thereby, the discs 68 and 70 and sheaves 88 and 139 could be enlarged appreciably to provide greater levels of digitizer accuracy without increased sensor sophistication and without increase in work area requirement.

As many modifications in the described construction could be conceived, and as many changes could be made therein without departing from the spirit and scope of the invention, it is intended that all matter contained in the accompanying specification shall be considered as illustrative only and not in a limiting sense.

We claim:

1. In a digitizer wherein transducing means, supported on a stationary base, comprises a first member having at least one annular face portion and mounted for rotation relative to said base about the axis of said face portion in response to movement of a first element along a first straight course relative to said base, and a second member having at least one annular face portion and mounted for rotation relative to said base about said axis of said last-mentioned face portion in response to said movement of said first element and to relative movement between said first element and a second element carried with said first element, said second element being movable relative to said first element along a second course extending along said first element perpendicularly to said first course, and wherein the transducing means further includes means for displaying for each of said members a separate symbol, said symbols respectively being representative of the angular displacements of, the first member relative to an initial angular reference position thereof fixed relative to the base, and of the second member relative to an initial angular reference position thereof fixed relative to the first member, in response to and correlated with any movement of the associated one of said first and second elements, relative to an initial reference position thereof, along the associated one of said first and second straight courses, the improvement comprising:

means for rotating: (1) said second member independently of said first member in response to linear movement of said second element along said second course, and (2) said first and second members simultaneously in response to linear movement of said first element, and means for preventing an effect on said displaying means resulting from movement of said second member in consequence of movement of said first element, said last-mentioned means including:

first means, fixed to said base, for sensing the angular displacement of said first member, relative to said initial angular reference position thereof, and second means, comprising a photosensor arranged for rotation with said first member, for sensing the angular displacement of said second member only when it is relative to said first member.

2. A combination according to claim 1 wherein said means for rotating comprises a rotatable shaft and a cylinder mounted for rotation concentrically with said shaft, said first member being rotatable relative to said base in response to movement of said first element relative to said base and being secured to said shaft, said second member being rotatable in response to movement of said first element relative to said base and to movment of said second element relative to said first element and being carried by said cylinder.

3. Apparatus for providing digital display of coordinate points of a two dimensional plane and comprising:
a stationary base;
a first slider mounted on said base and arranged for movement in a first linear path relative thereto;
a second slider mounted on said first slider for movement relative thereto in a second linear path extending perpendicularly to said first path;
a first supporting element mounted for rotational movement relative to said base and drive-coupled to said first slider;
a first member mounted on said first supporting element for rotation therewtih;
first pulley-cable drive coupling means for rotating said first member relative to aid base through an angle in response to and corresponding to the linear distance of movement of said first slider;
a second supporting element mounted for rotational movement relative to said base and drive-coupled to said second slider;
a second member mounted coaxially of said first member on said second supporting element for rotation therewith;
second pulley-cable drive coupling means for rotating said second member relative to said base through an angle in response to and corresponding to the linear distance of movement of said second slider plus the linear distance of movement of said first slider, and means for sensing the angular distance through which said first member moves, relative to said base, with said second member, in response to movement of said first slider relative to said base, and for sensing the angular distance through which said second member moves, relative to said first member, in response to movement of said second slider relative to said first slider, said means for sensing comprising first and second sensing assemblies, said first sensing assembly being fixed on said base adjacent said rotatable first member, and said second sensing assembly being mounted for rotation with said first member independently of rotation of said second member.

4. Apparatus according to claim 3 wherein each of said members is a disc having a plurality of arcuately spaced apart apertures, said first sensing assembly comprising a first lamp and a first photosensor aligned for exposure to said first lamp through apertures in said first disc for counting the angular distance of its rotation, and said second sensing assembly being secured to said first supporting element and comprising a second lamp and a second photosensor aligned for exposure to said second lamp through apertures in said second disc for sensing the angular distance of its rotation relative to said first disc.

5. A combination according to claim 3 wherein said second member is arranged for movement in response to movement of said first slider and wherein said means for sensing includes a first sensor assembly fixed on said base adjacent said first rotatable member for registering the rotation of said first member relative to said base, and a second sensor assembly arranged for rotation with said first member and responsive to the rotation of said second member relative to said first member.

6. A digitizer comprising:
a stationary base;
first and second elements mounted on said base for movement relative to said base along orthogonal paths, said second element carried by said first element;
a separate cable connected to each of said elements;
a first member connected to said first element through one of said cables for rotation about an axis of rotation relative to said base in response to movement in one of said paths;
a second member connected to the other cable and mounted parallel to said first member for coaxial rotation about said axis relative to said first member in response to movement of said second element linearly in the other of said paths and independently of any movement of said first element in said one path;
means for generating a first output in response to the angular distance through which said first member rotates relative to said base, and
means for generating a second output in response to the angular distance through which said second member rotates relative to said first member, said last-mentioned means being mounted for rotation with said first member about said axis so as to prevent the generation of said second output in response to the angular distance through which said second member rotates by reason of movement in only said one of said paths.

7. A combination according to claim 6 wherein said second output generating means comprises a pulse generator, and said preventing means comprises means rigidly securing said pulse generator to said first member for rotation about said axis, said pulse generator being responsive to rotation of said second member relative to said first member for generating said second output.

8. A combination according to claim 7 wherein said pulse generator comprises a photosensor and a lamp supported in operable alignment with said second member and wherein said second member is a disc having arcuately spaced apart openings through which said photosensor is successively and interruptedly exposed to said lamp only upon movement of said second element independently of movement of said first element.

9. A combination according to claim 8 wherein said first output generating means comprises another pulse generator comprising another lamp and photosensor photo-sensor fixedly supported on said base in operable alignment with said first member, and wherein said first member is another disc having arcuately spaced openings through which said other photosensor is successively and interruptedly exposed to said other lamp during all continuous movement in said first path.

10. A combination according to claim 9 further characterized by means for counting generated pulses according to the direction of rotation of said members, each relative to its associated photosensor.

11. A combination according to claim 10 wherein said counting means comprises a pair of up-down switches including sensors arranged for response to the direction of rotation of each disc relative to its associated photosensor.

12. A combination according to claim 6 wherein said first output generating means comprises a pulse generator mounted on said base adjacent said first member.

* * * * *

UNITED STATES PATENT OFFICE
CERTIFICATE OF CORRECTION

Patent No. 3,758,949  Dated September 18, 1973

Inventor(s) Charles A. Fausel et al.

It is certified that error appears in the above-identified patent and that said Letters Patent are hereby corrected as shown below:

Column 7, line 52, "therewtih" should read -- therewith --; line 54, "aid" should read -- said --. Column 9, line 20, after "and" insert -- another --. Column 10, line 1, cancel "photo-sensor --.

Signed and sealed this 8th day of October 1974.

(SEAL)
Attest:

McCOY M. GIBSON JR.
Attesting Officer

C. MARSHALL DANN
Commissioner of Patents